United States Patent
Ankit et al.

(10) Patent No.: US 10,008,132 B2
(45) Date of Patent: Jun. 26, 2018

(54) METHOD AND SYSTEM FOR PROTECTING DATA USING STEGANOGRAPHY

(71) Applicants: Anand Ankit, Bangalore Karnataka (IN); Rajnish Chandra, Bangalore Karnataka (IN)

(72) Inventors: Anand Ankit, Bangalore Karnataka (IN); Rajnish Chandra, Bangalore Karnataka (IN)

(73) Assignee: Unisys Corporation, Blue Bell, PA (US)

( * ) Notice: Subject to any disclaimer, the term of this patent is extended or adjusted under 35 U.S.C. 154(b) by 98 days.

(21) Appl. No.: 15/265,269

(22) Filed: Sep. 14, 2016

(65) Prior Publication Data

US 2017/0154396 A1    Jun. 1, 2017

(51) Int. Cl.
     *G06T 1/00*      (2006.01)
     *G09C 5/00*      (2006.01)

(52) U.S. Cl.
     CPC ............. *G09C 5/00* (2013.01); *G06T 1/0028* (2013.01); *G06T 2201/0051* (2013.01)

(58) Field of Classification Search
None
See application file for complete search history.

(56) References Cited

U.S. PATENT DOCUMENTS

| | | | |
|---|---|---|---|
| 6,912,658 B1 * | 6/2005 | Glogau | H04N 1/32154 380/43 |
| 2004/0125983 A1 * | 7/2004 | Reed | G06T 1/0021 382/100 |
| 2007/0138286 A1 * | 6/2007 | Kamijoh | G06K 7/14 235/462.04 |

* cited by examiner

*Primary Examiner* — Sumati Lefkowitz
*Assistant Examiner* — Jiangeng Sun

(57) ABSTRACT

A method and apparatus for embedding a data message in a carrier object using steganography. The method provides a secret key and determines an indicator channel from a plurality of color channels in the carrier object, wherein the indicator channel is the color channel in the carrier object that has a maximum number of different pixel values in the carrier object. The method generates a sorted indicator channel value array based on the channel values and the frequency of occurrence of each value of the indicator channel in the carrier object. For each indicator channel value in the sorted indicator channel value array, the method iterates through the carrier object to determine the pixel in the carrier object whose indicator channel value is the same as the current indicator channel value in the sorted indicator channel value array. For pixels in the carrier object whose indicator channel value is the same as the current indicator channel value, and based on the value of a portion of the secret key, the method embeds a first portion of the data message into a first color channel other than the indicator color channel and embeds a second portion of the data message into a second color channel other than the indicator color channel and other than the first color channel. The method repeats the iteration and embedding until all of the data message is embedded into the carrier object, thereby generating a stego image.

20 Claims, 7 Drawing Sheets

| Character | ASCII Value | Binary Representation |
|---|---|---|
| D | 100 | 1100100 |
| O | 111 | 1101111 |
| G | 103 | 1100111 |

30

| Channel Value | Frequency |
|---|---|
| 32 | 560 |
| 200 | 280 |
| 255 | 453 |
| 56 | 196 |
| 105 | 95 |
| 0 | 16 |

| Channel Value | Frequency |
|---|---|
| 0 | 16 |
| 105 | 95 |
| 56 | 196 |
| 200 | 280 |
| 255 | 453 |
| 32 | 560 |

If Indicator Channel is red:

| Key Bit | 1st Message Bit Embedded in: | 2nd Message Bit Embedded in: |
|---|---|---|
| 0 | Green Channel | Blue Channel |
| 1 | Blue Channel | Green Channel |

52

If Indicator Channel is green:

| Key Bit | 1st Message Bit Embedded in: | 2nd Message Bit Embedded in: |
|---|---|---|
| 0 | Red Channel | Blue Channel |
| 1 | Blue Channel | Red Channel |

54

If Indicator Channel is blue:

| Key Bit | 1st Message Bit Embedded in: | 2nd Message Bit Embedded in: |
|---|---|---|
| 0 | Red Channel | Green Channel |
| 1 | Green Channel | Red Channel |

If the Current Key Bit is 0, Component Channel Values of Current Pixel are Modified:

|  | Red | Green | Blue |
|---|---|---|---|
| Before Embedding | 00111000 | 01101000 | 01010000 |
| After Embedding | 00111000 | 01101001 | 01010000 |

— 62

If the Current Key Bit is 1, Component Channel Values of Current Pixel are Modified:

|  | Red | Green | Blue |
|---|---|---|---|
| Before Embedding | 00111000 | 01101000 | 01010000 |
| After Embedding | 00111000 | 01101001 | 01010001 |

If Indicator Channel is red:

| Key Bit | Retrieve 1st Message Bit from: | Retrieve 2nd Message Bit from: |
|---|---|---|
| 0 | Green Channel | Blue Channel |
| 1 | Blue Channel | Green Channel |

⟵ 72

If Indicator Channel is green:

| Key Bit | Retrieve 1st Message Bit from: | Retrieve 2nd Message Bit from: |
|---|---|---|
| 0 | Red Channel | Blue Channel |
| 1 | Blue Channel | Red Channel |

⟵ 74

If Indicator Channel is blue:

| Key Bit | Retrieve 1st Message Bit from: | Retrieve 2nd Message Bit from: |
|---|---|---|
| 0 | Red Channel | Green Channel |
| 1 | Green Channel | Red Channel |

| Red | Green | Blue |
|---|---|---|
| 00111000 | 01101001 | 01010000 |

METHOD AND SYSTEM FOR PROTECTING DATA USING STEGANOGRAPHY

BACKGROUND

Field

The instant disclosure relates to steganography, and in particular to methods and systems for protecting data using steganography.

Description of the Related Art

In today's world, communication security is crucial for the confidentiality of data being transmitted. Currently, more and more data is being transmitted with the help of devices, such as computers, using the Internet and other means as the communication channels. With technological advancement in data communications, unauthorized access to electronic data also has increased, Thus, there is a need to develop new ways to counter unauthorized access to data.

There are two widely used methods for protecting electronic data: cryptography and steganography. Cryptography is a technique for converting data into some unintelligible form that can be decoded only by the intended recipients. In cryptography, a sender encrypts a message using some algorithm, with the help of a key, which is shared with a receiver prior to the communication of the encrypted message to the receiver. The receiver can then decode the message using the same algorithm and the key.

Steganography is a method of hiding data in a carrier object in such a way that the existence of the data being sent is concealed. The carrier object can be any suitable carrier object, such as a text file, an image, a video file or an audio file. In image steganography, the carrier object typically is a digital image. This type of carrier object typically is called a cover image. Data typically is embedded in binary form either in the spatial domain or in the frequency domain of the cover image to produce a steganographic (or stego) image. A receiver can extract the embedded data using a predefined extraction algorithm. Alternatively, a key used by the sender to embed the data can be shared with the receiver prior to the stego image transmission to the receiver, and used by the receiver to extract the embedded data.

In the spatial domain, data is embedded directly into pixel values of the cover image. In the frequency domain, the cover image first is transformed into its frequency domain, and then data is embedded into the frequency coefficients. The cover image can be binary, a gray-level image or a color image.

There are various conventional stegnography techniques available in both the domains. In the spatial domain, there are pixel value differencing techniques and side matching techniques. In the frequency domain, there are LSB (least significant bit) substitution techniques and techniques using secret keys. The most widely used stegnography techniques involve LSB substitution in an image.

There are three basic elements in a typical steganography method. These elements are imperceptibility, capacity and robustness. Imperceptibility involves the stego image and the cover image not being distinguishable from each other. Capacity refers to the maximum amount of data that can be embedded in a cover image without producing significant distortion in the stego image. Robustness refers to the resistance capability of the method against various steganalysis attacks.

Because there typically is a trade-off between imperceptibility, capacity and robustness, there is a need to improve imperceptibility and robustness in steganography methods.

SUMMARY

Disclosed is a method and apparatus for embedding a data message in a carrier object using steganography. The method includes providing a secret key. The method also includes determining an indicator channel from the plurality of color channels in the carrier object, wherein the indicator channel is the color channel in the carrier object that has a maximum number of different pixel values in the carrier object. The method also includes generating a sorted indicator channel value array based on the channel values and the frequency of occurrence of each value of the indicator channel in the carrier object. The method also includes, for each indicator channel value in the sorted indicator channel value array, iterating through the carrier object to determine the pixel in the carrier object whose indicator channel value is the same as the current indicator channel value in the sorted indicator channel value array. The method also includes, for pixels in the carrier object whose indicator channel value is the same as the current indicator channel value, and based on the value of a portion of the secret key, embedding a first portion of the data message into a first color channel other than the indicator color channel and embedding a second portion of the data message into a second color channel other than the indicator color channel and other than the first color channel. The method also includes repeating the iterating step and the embedding step until all of the data message is embedded into the carrier object, thereby generating a stego image.

BRIEF DESCRIPTION OF THE DRAWINGS

FIG. 3 is a exemplary chart showing the value and frequency of occurrence of each channel value of the Indicator Channel (I) in an exemplary carrier object, according to an embodiment;

FIG. 4 is a exemplary chart showing the value and frequency of occurrence of each channel value of the Indicator Channel (I) in an exemplary carrier object, sorted in ascending order, according to an embodiment;

FIG. 5 is a chart showing how a data message is embedded into a carrier object based on the indicator channel and the value of a secret key, according to an embodiment;

FIG. 6 is a chart showing how component channel values within a carrier object are modified by embedding a portion of the data message therein, according to an embodiment;

FIG. 7 is a chart showing how an embedded data message is extracted from a carrier object based on the indicator channel and the value of a secret key, according to an embodiment;

FIG. 8 is a chart showing the red, green and blue channel components values for an example extraction, according to an embodiment;

DETAILED DESCRIPTION

Figures 1, 2:
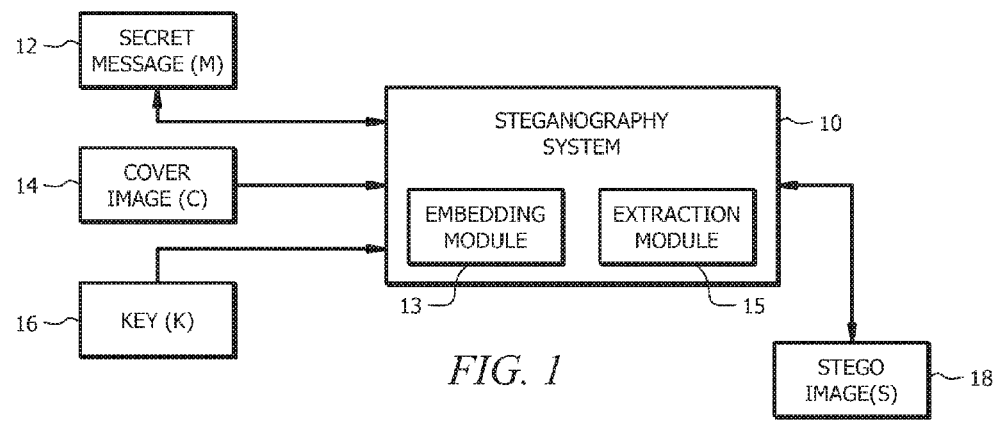
FIG. 1 is a schematic view of a system for embedding data using steganography, according to an embodiment.
FIG. 2 is an exemplary chart showing the ASCII value and binary representation of each letter of an exemplary secret key, according to an embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

According to an embodiment, inventive steganography methods and systems are described herein for embedding or hiding data in RGB (red-green-blue) color images, or in other suitable carrier objects. The inventive methods and systems described herein improve imperceptibility and robustness without compromising capacity, unlike conventional steganography methods. As will be described in greater detail hereinbelow, the inventive steganography methods and systems described herein are based on LSB (least significant bit) substitution.

The inventive methods and systems described herein typically use RGB color images, such as 24-bit RGB color images, because such color images are most commonly in use. Also, 24-bit RGB color images offer greater embedding capacity because they include an array of pixels where each pixel has three components: a red component, a green component and a blue component. Typically, the intensity of each color component is stored as a numerical channel value using 8 bits, A 24-bit RGB color image also is useful because each pixel is independent of all other pixels in the RGB color image. However, it should be understood that the inventive methods and systems described herein can be used with other images, including color images, as well as with other suitable carrier objects.

According to an embodiment, the methods and systems described herein embed or hide data in RGB color images using the color channel with a maximum number of different values as an indicator channel. The indicator channel is used as a flag to embed data into the least significant bits (LSBs) of the two other color channels. Different intensity values of the indicator channel are used to select random pixels for embedding. A secret key also is used to determine the order of hiding data in the remaining two channels of the randomly selected pixel. Flag information, together with the secret key, is used for extracting the hidden data from the stego image. According to an embodiment, the inventive methods described herein spread the data randomly across the image rather than embedding it sequentially, as in many conventional LSB substitution approaches. In this manner, the inventive methods described herein are more resistant to enhanced LSB attacks than conventional methods because of randomization achieved in embedding data.

The inventive methods described herein also are relatively robust, and the resultant stego images produced have relatively high peak signal-to-noise ratio (PSNR) values, which is a typical steganography measurement parameter. Also, compared to conventional steganography methods, the inventive methods described herein produce stego images with a lower mean square error (MSE) value, which is a parameter for measuring the difference between an original image and the corresponding stego image. In this manner, the inventive methods described herein produce stego images that are more imperceptible than the stego images of conventional steganography methods. Also, the inventive methods described herein produce stego images that are relatively resistant to enhanced LSB attack, which is a measure of robustness.

FIG. 1 is a schematic view of a system 10 for embedding data using steganography, according to an embodiment. According to an embodiment, inputs into the steganography system 10 include a data message or secret message (M) 12, a cover image (C) 14, and a secret key (K) 16. The secret message (M) 12 is the data that is to be embedded or hid in the cover image (C) 14. The cover image (C) 14 is the carrier object into which the secret message (M) 12 is to be embedded or hid. The generated output from the steganography system 10 is a stego image (S) 18, with the data from the secret message (M) 12 embedded or hidden therein.

According to an embodiment, the steganography system 10 includes an embedding module or receiver 13 for receiving the secret message (M) 12, the cover image (C) 14, and the key (K) 16 as system inputs, as will be discussed in greater detail hereinbelow. The steganography system 10 also can include an extraction module 15 for extracting the embedded data message from the generated stego image (S) 18, as will be discussed in greater detail hereinbelow.

According to an embodiment, a user provides the secret message (M) 12, the cover image (C) 14 and the secret key (K) 16 to the steganography system 10. Using the embedding module 13, the steganography system 10 converts the secret key (K) 16 into binary form, e.g., by concatenating the binary form of each character in the secret key (K) 16. For example, assume that the secret key (K) 16 is "DOG." As illustrated in the chart 20 in FIG. 2, each character 22 of the secret key (K) 16 has an ASCII value 24 and a corresponding binary representation 26. Therefore, the secret key (K) 16 in binary form is represented as 110010011011111100111. A copy of the secret key (K) 16 in binary form also is kept for future reference.

Once the secret key (K) 16 is converted into binary form, the embedding module 13 determines which color channel in the cover image (C) 14 has a maximum number of different values (e.g., in the range of 0-255). This color channel is called the Indicator Channel (I). Once the Indicator Channel (I) has been determined, an indicator channel flag is set based on the color of the Indicator Channel (I), For example, if the Indicator Channel (I) is red, the indicator channel flag is set to 0, if the Indicator Channel (I) is green, the indicator channel flag is set to 1, and if the Indicator Channel (I) is blue, the indicator channel flag is set to 2. For example, if the red channel has 32 different values in the cover image (C) 14, the green channel has 41 different values in the cover image (C) 14, and the blue channel has 29 different values in the cover image (C) 14, the green channel is stored as the Indicator Channel (I) and the indicator channel flag is set to 1, The indicator channel flag is stored within the steganography system 10, along with the binary form of the secret key (K) 16.

Once the indicator channel flag and the secret key (K) 16 have been stored within the steganography system 10, the distinct channel values of the Indicator Channel (I) and the frequency of occurrence of each distinct channel value of the Indicator Channel (I) are stored in a two dimensional array. For example, in the chart shown in FIG. 3, each distinct channel value 32 of the Indicator Channel (I) (e.g., the green channel) within the cover image (C) 14, and its frequency of occurrence 34 within the cover image (C) 14, is stored in a two dimensional array 30.

Once the two dimensional array 30 has been generated, the distinct channel values of the Indicator Channel (I) (e.g., the green channel) in the two dimensional array 30, and their corresponding frequency of occurrence, are sorted according to their frequency of occurrence, in ascending order. The resulting sorted indicator channel value array 40 is shown in FIG. 4. As shown in FIG. 4, the Indicator Channel (I) values 42 and their respective frequency of occurrence 44 are sorted in ascending order in the sorted indicator channel value array 40.

Once the indicator channel values in the cover image (C) 14, and their corresponding frequency of occurrence, have been sorted according to their frequency of occurrence, the secret message (M) 12 is retrieved and a null character (00000000) is appended to the secret message (M) 12. The secret message (M) 12 with the appended null character then is converted into binary form. Typically, each character in the secret message (M) 12 is represented as 8 bits in binary form. Therefore, for example, if the secret message (M) 12 is "hello," the secret message (M) 12 with the appended null character is represented as 01101000 01100101 01101100 01101100 01101111 00000000.

Once the secret message (M) 12 with the appended null character has been converted into binary form, the first indicator channel value from the sorted indicator channel value array 40 is retrieved, Using this first indicator channel value as the current indicator channel value, an iterative check is made of the indicator channel value of each pixel in the cover image (C) 14 (for the same color channel as the color of the Indicator Channel) to find the pixels whose indicator channel value is the same as the current indicator channel value. For example, if the Indicator Channel (I) is green and the current indicator channel value is 0 (e.g., the first indicator channel value from the sorted indicator channel value array 40), then an iterative check is made of the channel value of each green component of each pixel in the cover image (C) 14 to determine which pixels in the cover image (C) 14 have a green component channel value of 0.

For each pixel in the cover image (C) 14 whose indicator channel value is the same value as the current indicator channel value, a portion of the data message (M) 12 is embedded in the pixel based on the Indicator Channel (I) and the value of a key bit, e.g., in the manner shown in the charts 50 of FIG. 5 and described below. For example, a first or current bit is retrieved or taken from the key (K) 16. If the retrieved bit from the from the key is 0, then the first or current two bits are taken from the data message and, if the indicator channel is red, the least significant bit (LSB) of the green channel of the current pixel is replaced with the first bit taken from the data message, and the LSB of the blue channel of the current pixel is replaced with the second bit taken from the data message. If the retrieved bit from the from the key is 1, and if the indicator channel is red, the LSB of the blue channel of the current pixel is replaced with the first bit taken from the data message, and the LSB of the green channel of the current pixel is replaced with the second bit taken from the data message. This embedding is shown in a first chart 52 in FIG. 5.

If the retrieved bit from the from the key is 0, and if the indicator channel is green, the LSB of the red channel of the current pixel is replaced with the first bit taken from the data message, and the LSB of the blue channel of the current pixel is replaced with the second bit taken from the data message. If the retrieved bit from the from the key is 1, and if the indicator channel is green, the LSB of the blue channel of the current pixel is replaced with the first bit taken from the data message, and the LSB of the red channel of the current pixel is replaced with the second bit taken from the data message. This embedding is shown in a second chart 54 in FIG. 5.

If the retrieved bit from the from the key is 0, and if the indicator channel is blue, the LSB of the red channel of the current pixel is replaced with the first bit taken from the data message, and the LSB of the green channel of the current pixel is replaced with the second bit taken from the data message. If the retrieved bit from the from the key is 1, and if the indicator channel is blue, the LSB of the green channel of the current pixel is replaced with the first bit taken from the data message, and the LSB of the red channel of the current pixel is replaced with the second bit taken from the data message. This embedding is shown in a third chart 56 in FIG. 5.

Typically, the length of the key (K) 16 is less than the length of the data message. Therefore, a temporary key (T), which is a copy of the original secret key, is appended to the key (K) 16 if the most recent bit retrieved from the key (K) 16 was the last bit of the key, That is, K=K T.

Once the first two bits of the data message have been embedded into the current pixel, as described hereinabove, the next available pixel in the cover image (C) 14 whose indicator channel value is the same value as the current indicator channel value becomes the current pixel, and the next two bits from the data message are embedded in the new current pixel in the same manner as described hereinabove. This embedding continues until all bits of the data message are embedded into the pixels of the cover image (C) 14.

If all pixels in the cover image (C) 14 whose indicator channel value is the same value as the current indicator channel value have been used for embedding portions of the data message, and all bits of the data message have not yet been embedded, then the next value from the sorted indicator channel value array 40 is selected as the current indicator channel value, and an iterative check is made of the indicator channel value of each pixel in the cover image (C) 14 to find the pixels whose indicator channel value is the same as the new current indicator channel value. The pixels in the cover image (C) 14 whose indicator channel value is the same as the new current indicator channel value then are used to embed the remaining bits from the data message in the same manner as described hereinabove. The data message bits are embedded into the pixels in the cover image (C) 14 in this manner until all bits from the data message are embedded into the pixels of the cover image (C) 14.

Once all of the bits from the data message (M) 12 are embedded into the pixels of the cover image (C) 14, the embedding module 13 generates a resulting stego image (S) 18, which is output from the steganography system 10.

For example, for a given cover image (C) 14, assume that the red channel has the maximum number of different values, and therefore the red channel is the Indicator Channel (I). Also, for example, assume that the current channel value in the sorted array is 56. According to an embodiment, an iterative check is made of the indicator channel value of each pixel in the cover image (C) 14 to find the pixels whose red channel value is 56. In this manner, assume that a pixel in the cover image (C) 14 is found that has a red channel value of 56, a green channel value of 104, and a blue channel value of 80. This pixel becomes the current pixel. Also, assume that the most recent two bits of the data message are "10."

If the current key bit is 0, the component channel values of the current pixel in the cover image (C) 14 are modified as shown in a first chart 62 of the charts 60 shown in FIG.

6. That is, the LSB of the green channel of the current pixel is replaced with "1" (i.e., the first bit from the data message "10") and the LSB of the blue channel is replaced with "0" (i.e., the second bit from the data message "10"). If the current key bit is 1, the component channel values of the current pixel in the cover image (C) 14 are modified as shown in a second chart 64 of the charts 60 shown in FIG. 6. That is, the LSB of the blue channel of the current pixel is replaced with "1" (i.e., the first bit from the data message "10") and the LSB of the green channel is replaced with "0" (i.e., the second bit from the data message "10"). As discussed hereinabove, embedding of the data message into pixels of the cover image (C) 14 continues in this manner until all bits from the data message are embedded into the pixels of the cover image (C) 14.

To extract the data message (M) 12 from the stego image (S) 18, the extraction module 15 converts the secret key (K) 16 into binary form (or retrieves the secret key from its stored location in the steganography system 10. Also, the extraction module 15 identifies the Indicator Channel (I) from the value of the previously set indicator channel flag, as discussed hereinabove. Also, using the extraction module 15, the distinct channel values of the Indicator Channel (I) and the frequency of occurrence of each distinct channel value of the Indicator Channel (I) are stored in a two dimensional array, and then sorted according to their frequency of occurrence, in ascending order, as discussed hereinabove.

Using the extraction module 15, the (first or) current channel value from the sorted indicator channel value array is retrieved. Using the extraction module 15, and with reference to the current indicator channel value, an iterative check is made of the indicator channel value of each pixel in the stego image (S) 18 (for the same color channel as the color of the Indicator Channel) to find the pixels whose indicator channel value is the same as the current indicator channel value. For each pixel in the stego image (S) 18 whose indicator channel value is the same value as the current indicator channel value, a portion of the data message (e.g., two data message bits) is extracted from the pixel based on the Indicator Channel (I) and the value of a key bit, e.g., as shown in the charts 70 of FIG. 7 and described below.

First, a bit is retrieved or taken from the key (K) 16. If the retrieved key bit is 0, and if the indicator channel is red, a first data message bit is retrieved from the LSB of the green channel of the current pixel of the stego image, and a second data message bit is retrieved from the LSB of the blue channel of the current pixel of the stego image. If the retrieved key bit is 1, and if the indicator channel is red, a first data message bit is retrieved from the LSB of the blue channel of the current pixel of the stego image, and a second data message bit is retrieved from the LSB of the green channel of the current pixel of the stego image. This extraction is shown in a first chart 72 in FIG. 7.

If the retrieved bit from the from the key is 0, and if the indicator channel is green, a first data message bit is retrieved from the LSB of the red channel of the current pixel of the stego image, and a second data message bit is retrieved from the LSB of the blue channel of the current pixel of the stego image. If the retrieved key bit is 1, and if the indicator channel is green, a first data message bit is retrieved from the LSB of the blue channel of the current pixel of the stego image, and a second data message bit is retrieved from the LSB of the red channel of the current pixel of the stego image. This extraction is shown in a second chart 74 in FIG. 7.

If the retrieved bit from the from the key is 0, and if the indicator channel is blue, a first data message bit is retrieved from the LSB of the red channel of the current pixel of the stego image, and a second data message bit is retrieved from the LSB of the green channel of the current pixel of the stego image. If the retrieved key bit is 1, and if the indicator channel is blue, a first data message bit is retrieved from the LSB of the green channel of the current pixel of the stego image, and a second data message bit is retrieved from the LSB of the red channel of the current pixel of the stego image. This extraction is shown in a third chart 76 in FIG. 7.

Similar to the discussion hereinabove, the length of the key (K) 16 typically is less than the length of the data message, Therefore, a temporary key (T), which is a copy of the original secret key, is appended to the secret key if the most recent bit retrieved from the key (K) 16 was the last bit of the key. That is, K=K+T.

This extraction continues until all bits of the data message are extracted from the pixels of the stego image (S) 18, thereby resulting in an extraction of the secret data message (M) 12 from the stego image (S) 18.

As an example, assume that the stego image (S) 18 has a data message (M) 12 embedded therein according to an embodiment, e.g., as discussed hereinabove. Also, assume that the indicator channel flag is set to 0, i.e., the Indicator Channel (I) is red. Also, assume that the current pixel in the stego image (S) 18 has a red channel value of 56, a green channel value of 105, and a blue channel value of 80. FIG. 8 is a chart 80 showing the red, green and blue channel components values for the example extraction, according to an embodiment.

In this example, if the current key bit is 0, then the retrieved message is "10." That is, as discussed hereinabove, if indicator channel is red (i.e., the indicator channel flag is 0), and the current key bit is 0, a first data message bit is retrieved from the LSB of the green channel (i.e., a bit 1) and a second data message bit is retrieved from the LSB of the blue channel (i.e., a bit 0). If the current key bit is 1, then the retrieved message is "01." That is, as discussed hereinabove, if indicator channel is red (i.e., the indicator channel flag is 0), and the current key bit is 1, a first data message bit is retrieved from the LSB of the blue channel (i.e., a bit 0) and a second data message bit is retrieved from the LSB of the green channel (i.e., a bit 1).

Figure 9:
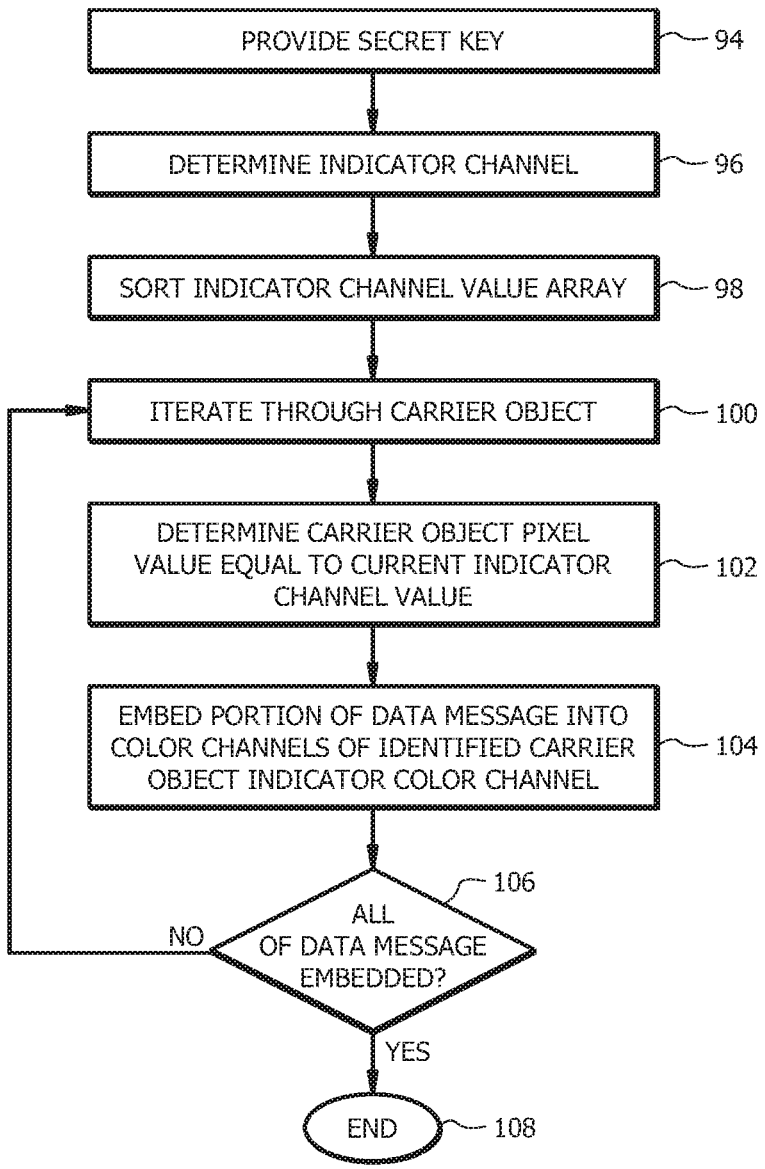
FIG. 9 is a flow diagram of a steganography method for embedding a data message into a carrier object using steganography, according to an embodiment.

FIG. 9 is a flow diagram 90 of a steganography method for embedding a data message into a carrier object using steganography, according to an embodiment. The method 90 includes a step 94 of providing a secret key. As discussed hereinabove, the data message, the carrier object and a secret key are provided as inputs to the steganography system. The secret key is converted into binary form.

The method 90 also includes a step 96 of determining an Indicator Channel (I). As discussed hereinabove, an embedding module or other appropriate component within the steganography system determines which color channel in the cover image carrier object has a maximum number of different values, and this color channel is called the Indicator Channel (I).

The method 90 also includes a step 98 of sorting the indicator channel value array. As discussed hereinabove, the distinct channel values of the Indicator Channel (I) and the frequency of occurrence of each distinct channel value of the Indicator Channel (I) within the cover image carrier object are stored in a two dimensional array. Then, the distinct channel values of the Indicator Channel (I) in the two dimensional array, and their corresponding frequency of occurrence, are sorted according to their frequency of occurrence, in ascending order.

The method 90 also includes a step 100 of iterating through the cover image carrier object, a step 102 of determining the carrier object indicator channel value equal to the current indicator channel value, and a step 104 of embedding a portion of the data message into the color channels of the identified carrier object indicator channel values. As discussed hereinabove, the first indicator channel value from the sorted indicator channel value array is retrieved and designated as the current indicator channel value. Using this current indicator channel value, an iterative check is made of the indicator channel value of each pixel in the cover image carrier object (for the same color channel as the color of the Indicator Channel) to find the pixels whose indicator channel value is the same as the current indicator channel value. For each pixel in the cover image carrier object whose indicator channel value is the same value as the current indicator channel value, a portion of the data message is embedded in the pixel based on the Indicator Channel (I) and the value of a key bit, as described hereinabove.

The method 90 also includes a decision step 106 of determining whether all of the data message has been embedded into the cover image carrier object. If all of the data message has not been embedded into the cover image carrier object (N), the method 90 returns to the step 100 of iterating through the cover image carrier object to find additional pixels whose indicator channel value is the same as the current indicator channel value, and to embed additional portions of the data message into those pixels, based on the Indicator Channel (I) and the value of a key bit. The method 90 performs the iteration step 100, the determining step 102 and the embedding step 104 until all of the data message has been embedded into the cover image carrier object.

When all of the data message has been embedded into the cover image carrier object (Y), the method 90 ends (108).

Figure 10:
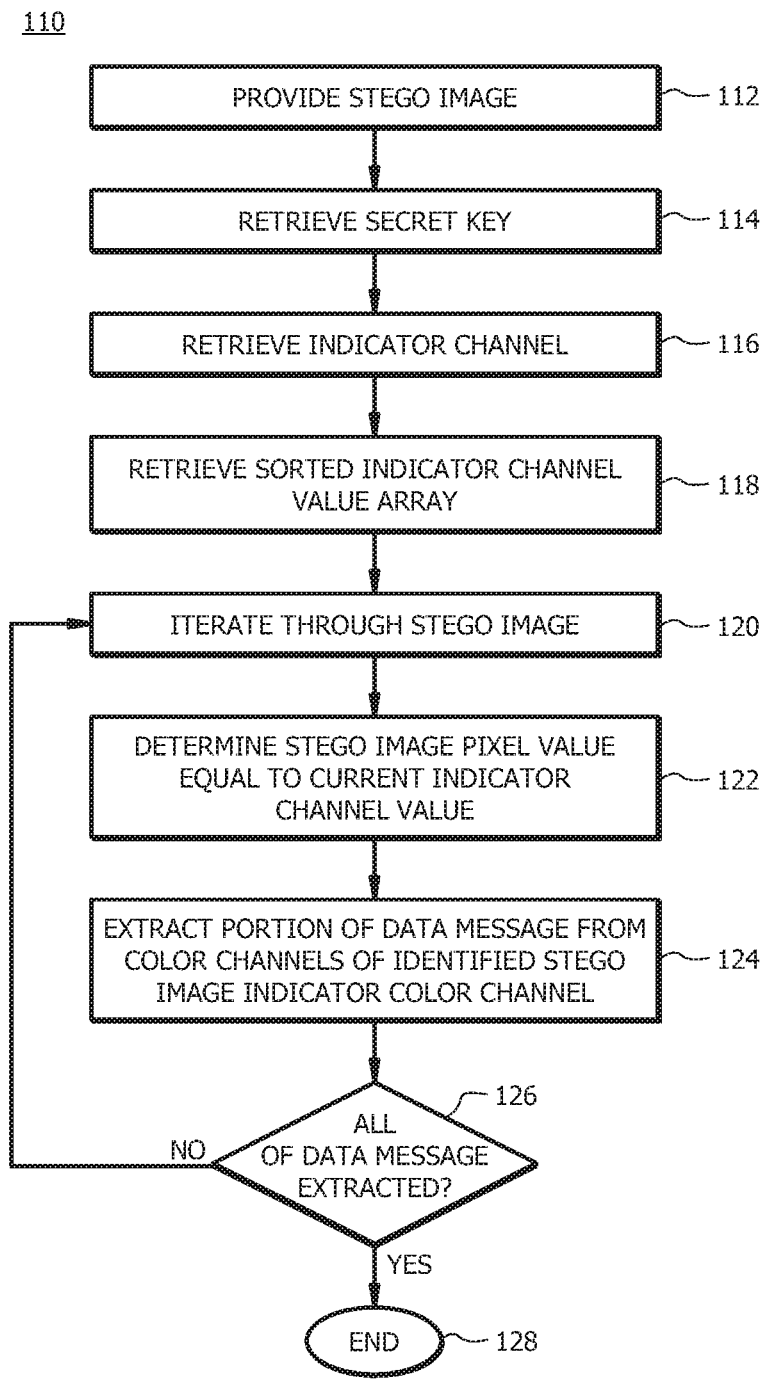
FIG. 10 is a flow diagram of a steganography method for extracting an embedded data message from a stego carrier object, according to an embodiment.

FIG. 10 is a flow diagram 110 of a steganography method for extracting an embedded data message from a stego carrier object, according to an embodiment. The method 110 includes a step 112 of providing a stego image, which is generated by embedding a data message into a cover image carrier object, e.g., as performed by the embedding method 90, discussed hereinabove.

The method 110 also includes a step 114 of retrieving a secret key. As discussed hereinabove, an extraction module or other appropriate component within the steganography system retrieves the secret key and converts it into binary form.

The method 110 also includes a step 116 of retrieving the Indicator Channel (I). As discussed hereinabove, the extraction module or other appropriate component within the steganography system identifies the Indicator Channel (I) from the value of a previously set indicator channel flag.

The method 110 also includes a step 118 of retrieving the sorted indicator channel value array. As discussed hereinabove, using the extraction module or other appropriate component within the steganography system, the distinct channel values of the Indicator Channel (I) and the frequency of occurrence of each distinct channel value of the Indicator Channel (I) are stored in a two dimensional array, and then sorted according to their frequency of occurrence, in ascending order.

The method 110 also includes a step 120 of iterating through the stego image, a step 122 of determining the stego image object indicator channel value equal to the current indicator channel value, and a step 124 of extracting a portion of the data message from the color channels of the identified stego image indicator channel values. As discussed hereinabove, the first indicator channel value from the sorted indicator channel value array is retrieved and designated as the current indicator channel value. Using this current indicator channel value, an iterative check is made of the indicator channel value of each pixel in the stego image (for the same color channel as the color of the Indicator Channel) to find the pixels whose indicator channel value is the same as the current indicator channel value. For each pixel in the stego image whose indicator channel value is the same value as the current indicator channel value, a portion of the data message is extracted from the pixel based on the Indicator Channel (I) and the value of a key bit, as described hereinabove.

The method 110 also includes a decision step 126 of determining whether all of the data message has been extracted from the stego image. If all of the data message has not been extracted from the stego image (N), the method 110 returns to the step 120 of iterating through the stego image to find additional pixels whose indicator channel value is the same as the current indicator channel value, and to extract additional portions of the data message from those pixels, based on the Indicator Channel (I) and the value of a key bit. The method 110 performs the iteration step 120, the determining step 122 and the extraction step 124 until all of the data message has been extracted from the stego image.

When all of the data message has been extracted from the stego image (Y), the method 110 ends (128).

It will be apparent to those skilled in the art that many changes and substitutions can be made to the embodiments described herein without departing from the spirit and scope of the disclosure as defined by the appended claims and their full scope of equivalents.

The invention claimed is:

1. A steganography method for embedding a data message in a carrier object having a plurality of color channels, the method comprising:
   providing a secret key;
   determining an indicator channel from the plurality of color channels in the carrier object, wherein the indicator channel is the color channel in the carrier object that has a maximum number of different pixel values in the carrier object;
   generating a sorted indicator channel value array based on the channel values and the frequency of occurrence of each value of the indicator channel in the carrier object;
   for each indicator channel value in the sorted indicator channel value array, iterating through the carrier object to determine the pixel in the carrier object whose indicator channel value is the same as the current indicator channel value in the sorted indicator channel value array;
   for pixels in the carrier object whose indicator channel value is the same as the current indicator channel value, and based on the value of a portion of the secret key, embedding a first portion of the data message into a first color channel other than the indicator color channel and embedding a second portion of the data message into a second color channel other than the indicator color channel and other than the first color channel; and
   repeating the iterating step and the embedding step until all of the data message is embedded into the carrier object, thereby generating a stego image.

2. The method as recited in claim 1, wherein generating a sorted indicator channel value array based on the channel values and frequency of occurrence of each pixel value of the indicator channel in the carrier object further comprises:
storing in a two dimensional array the channel values and frequency of occurrence of each pixel value of the indicator channel in the carrier object, and
sorting the two dimensional array in ascending order based on the frequency of occurrence of the indicator channel pixel values in the carrier object to generate a sorted indicator channel value array.

3. The method as recited in claim 1, wherein the data message is converted into binary form, and wherein the first portion of the data message embedded into the carrier object is the first of two bits from the binary form of the data message and the second portion of the data message embedded into the carrier object is the second of two bits from the binary form of the data message.

4. The method as recited in claim 1, wherein the color channels are represented in binary form, and wherein the first portion of the data message is embedded into the least significant bit (LSB) of the first color channel other than the indicator color channel, and wherein the second portion of the data message is embedded into the least significant bit (LSB) of the second color channel other than the indicator color channel and other than the first color channel.

5. The method as recited in claim 1, further comprising extracting the embedded data message from the stego image, wherein extracting the data message from the stego image includes:
for each indicator channel value in the sorted indicator channel value array, iterating through the carrier object to determine the pixel in the carrier object whose channel value is the same as the current indicator channel value in the sorted indicator channel value array;
for pixels in the carrier object that are the same as the current indicator channel value in the sorted indicator channel value array, and based on the value of a portion of the secret key, retrieving the embedded first portion of the data message from the first color channel other than the indicator color channel and retrieving the embedded second portion of the data message from the second color channel other than the indicator color channel and other than the first color channel.

6. The method as recited in claim 5, wherein the color channels are represented in binary form, and wherein the first portion of the embedded data message is retrieved from the least significant bit (LSB) of the first color channel other than the indicator color channel, and wherein the embedded second portion of the data message is retrieved from the least significant bit (LSB) of the second color channel other than the indicator color channel and other than the first color channel.

7. The method as recited in claim 1, further comprising setting an indicator channel flag based on the color of the indicator channel, wherein the value of the indicator channel flag identifies the indicator channel color.

8. The method as recited in claim 1, wherein the data message has appended thereto a null character to indicate the end of the data message, and wherein the iterating step and the embedding step are performed until the null character is embedded into the carrier object.

9. The method as recited in claim 1, wherein providing the secret key further comprises converting the key into binary form, and wherein the portion of the secret key used as the basis for embedding portions of the data message into the carrier object includes at least one of a most significant bit of the binary form of the secret key.

10. The method as recited in claim 1, wherein the carrier object is a 24-bit red-green-blue (RGB) color image.

11. A steganography apparatus for embedding a data message in a carrier object having a plurality of color channels, the apparatus comprising:
an embedding module for receiving the data message, the carrier object, and a secret key, wherein the embedding module is configured to:
determine an indicator channel from the plurality of color channels in the carrier object, wherein the indicator channel is the color channel in the carrier object that has a maximum number of different pixel values in the carrier object,
generate a sorted indicator channel value array based on the channel values and the frequency of occurrence of each value of the indicator channel in the carrier object,
for each indicator channel value in the sorted indicator channel value array, iterate through the carrier object to determine the pixel in the carrier object whose indicator channel value is the same as the current indicator channel value in the sorted indicator channel value array,
for pixels in the carrier object whose indicator channel value is the same as the current indicator channel value, and based on the value of a portion of the secret key, embed a first portion of the data message into a first color channel other than the indicator color channel and embed a second portion of the data message into a second color channel other than the indicator color channel and other than the first color channel, and
repeat the iterating step and the embedding step until all of the data message is embedded into the carrier object, thereby generating a stego image; and
an extraction module for extracting the embedded data message from the stego image.

12. The apparatus as recited in claim 11, wherein generating a sorted indicator channel value array based on the channel values and frequency of occurrence of each pixel value of the indicator channel in the carrier object further comprises:
storing in a two dimensional array the channel values and frequency of occurrence of each pixel value of the indicator channel in the carrier object, and
sorting the two dimensional array in ascending order based on the frequency of occurrence of the indicator channel pixel values in the carrier object to generate a sorted indicator channel value array.

13. The apparatus as recited in claim 11, wherein the data message is converted into binary form, and wherein the first portion of the data message embedded into the carrier object is the first of two bits from the binary form of the data message and the second portion of the data message embedded into the carrier object is the second of two bits from the binary form of the data message.

14. The apparatus as recited in claim 11, wherein the color channels are represented in binary form, and wherein the first portion of the data message is embedded into the least significant bit (LSB) of the first color channel other than the indicator color channel, and wherein the second portion of the data message is embedded into the least significant bit (LSB) of the second color channel other than the indicator color channel and other than the first color channel.

15. The apparatus as recited in claim 11, wherein the extraction module is configured to:

for each indicator channel value in the sorted indicator channel value array, iterate through the carrier object to determine the pixel in the carrier object whose channel value is the same as the current indicator channel value in the sorted indicator channel value array;

for pixels in the carrier object that are the same as the current indicator channel value in the sorted indicator channel value array, and based on the value of a portion of the secret key, retrieve the embedded first portion of the data message from the first color channel other than the indicator color channel and retrieve the embedded second portion of the data message from the second color channel other than the indicator color channel and other than the first color channel.

16. The apparatus as recited in claim 15, wherein the color channels are represented in binary form, and wherein the first portion of the embedded data message is retrieved from the least significant bit (LSB) of the first color channel other than the indicator color channel, and wherein the embedded second portion of the data message is retrieved from the least significant bit (LSB) of the second color channel other than the indicator color channel and other than the first color channel.

17. The apparatus as recited in claim 11, wherein the embedding module is further configured to set an indicator channel flag based on the color of the indicator channel, wherein the value of the indicator channel flag identifies the indicator channel color.

18. The apparatus as recited in claim 11, wherein the data message has appended thereto a null character to indicate the end of the data message, and wherein the iterating step and the embedding step are performed until the null character is embedded into the carrier object.

19. The apparatus as recited in claim 11, wherein providing the secret key further comprises converting the key into binary form, and wherein the portion of the secret key used as the basis for embedding portions of the data message into the carrier object includes at least one of a most significant bit of the binary form of the secret key.

20. The apparatus as recited in claim 11, wherein the carrier object is a 24-bit red-green-blue (RGB) color image.

* * * * *